Dec. 29, 1970   U. S. JAMES   3,551,006
PIPE FITTINGS AND ABRASION RESISTANT LININGS THEREFOR
Filed Aug. 4, 1967
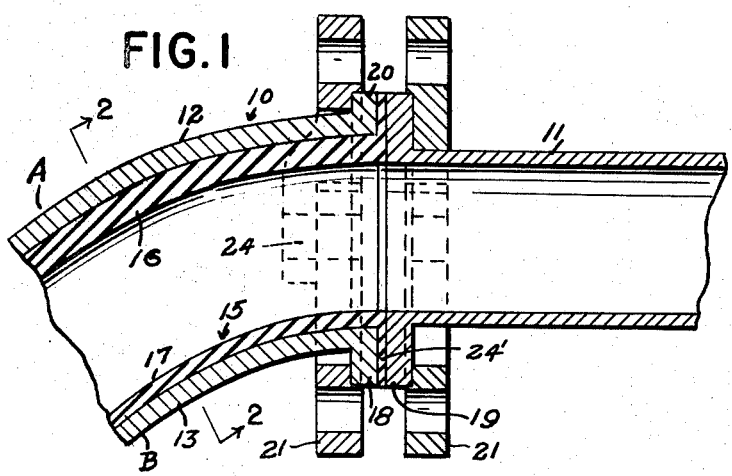
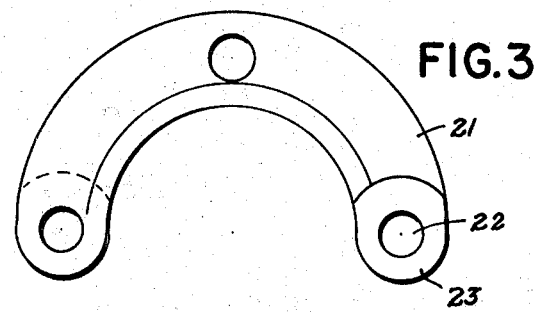
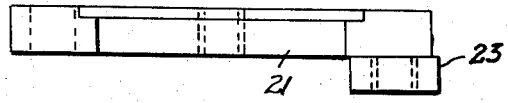
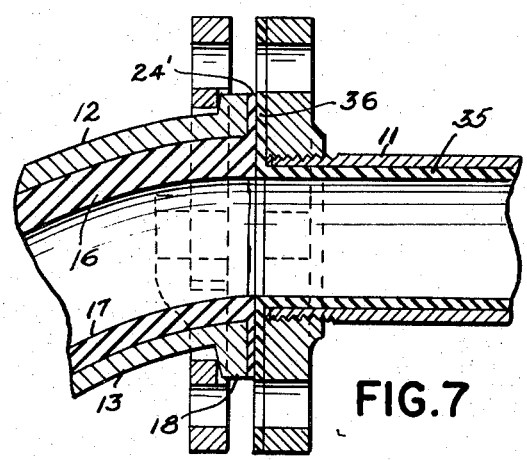
INVENTOR.
Ulysses S. James
by
Joseph Hirschmann
ATTORNEY.

United States Patent Office 3,551,006
Patented Dec. 29, 1970

3,551,006
PIPE FITTINGS AND ABRASION RESISTANT LININGS THEREFOR
Ulysses S. James, P.O. Box 377, Elizabeth, N.J. 07207
Filed Aug. 4, 1967, Ser. No. 658,421
Int. Cl. F16l 55/00
U.S. Cl. 285—16                    5 Claims

ABSTRACT OF THE DISCLOSURE

Angular pipe fittings or sections which change the direction of flow of abrasive slurries, and the like, are provided with abrasion-resistant linings which are thicker at the regions of impact than at the opposite portions of the fittings to prolong the life of the fittings while preserving a uniform flow cross-section with respect to the piping connected thereto, means being provided for liquid-tight connections with such connecting piping.

---

The present invention relates to pipe fittings or sections forming part of a conveyor or conduit system for fluent materials, particularly liquids carrying abrasive particles in suspension, and to the means for protecting such fittings against wear and thereby prolonging the life thereof.

More specifically, the invention relates to pipe fittings or sections, such as elbows, Y's and T's and the like, which act to change the direction of flow of abrasive fluent material and are lined with an abrasion-resistant material.

It is the general object of the invention to provide an improved lining construction for such pipe fittings, which are usually made of cast iron or steel, but may be made of other materials, the lining and hence the fittings protected thereby, having an increased life span over known linings, the lined parts being characterized by freedom from throttling effects and ease of connection to adjoining pipe sections.

As the invention is of particular utility in connection with elbows, it will be further described in detail in connection with such pipe or conduit elements, but it will be understood that the invention is equally applicable to other fittings which are designed to change the direction of a flowing abrasive material.

It is a specific object of the invention to provide an improved elbow lining composed of elastomeric material and of greater thickness at its outer periphery than at its inner periphery, but causing no reduction in the cross-sectional area of flow when attached to a lined or unlined pipe section.

It is a further object of the invention to provide a plastic, and particularly an elastomeric, lining for pipe elbows which is of greater thickness in the region where the flow is fastest and the impact against the lining the greatest.

Other objects and advantages will appear from the following detailed description of the invention.

As is known, upon change in direction of flow of a slurry or other fluent material containing abrasive particles in suspension, the wall facing the oncoming stream is subjected to continuous bombardment by such particles, with the result that even iron and steel are rapidly worn down and the fittings must be replaced at frequent intervals. The down time then suffered represents a much greater economic loss than even the cost of the fittings.

To reduce this loss, pipe fittings have been provided with rubber or rubber-like linings which better absorb the impact and better withstand the abrasive action of the particles than do metals. Where the linings were provided only in the angular fittings, as in elbows, and not in the connecting straight pipe sections, the resulting reduction in the cross-sectional area of flow was accompanied by an increase in the velocity of the fluid stream. This velocity increase actually was self-defeating in its consequences, for it greatly increased the force with which the particles struck what I herein term the "impact region," since the centrifugal force acting on the particles increases as the square of the velocity. This known means for protecting the angular fittings therefore fell short of the objective.

To avoid the throttling and resulting increase of speed of pipe conveyor systems wherein only the angular sections were lined, and to keep the flow cross-section uniform throughout the feed line, receiving line and connecting angular fittings, resort has been had to providing all of these sections with a lining, the thickness of the lining being taken into account in determining the pipe diameter for a desired rate of flow. This solution likewise was not entirely satisfactory, among other reasons because wear in, for example, an elbow was unavoidably greater than in the connecting straight section of pipe, so that the flow cross-section in the elbow soon became greater than in the feeding section, resulting in drop in pressure and eddy currents in the elbow, which tended to increase wear still further in the elbow and in the down stream straight pipe section. Moreover, the wear on the lining was not uniform, resulting in considerable waste.

A review of the prior art so far as known to me makes it apparent that prior investigators have assumed that metallic pipe sections, including angular fittings, for conveyor systems for abrasive slurries and the like, must inherently or of necessity be of circular cross-section to achieve the optimum conditions for flow, and this universally accepted tradition-bound approach has led to the difficulties briefly outlined above.

The present invention departs from the prior basic assumption that for best results, pipe sections, including angular fittings, must be circular in cross-section. I have found that by making the angular pipe fitting itself of nonuniform cross-section in comparison with the regular cylindrical straight sections of pipe leading to and from it, unexpected advantages are secured with regard to the lining of such fittings.

In accordance with the present invention, pipe fittings, and particular elbows, which are designed to change the direction of flow of fluid material, are so constructed that they are of greater internal radius, i.e., measured from the center line of the elbow, at the impact region, than at the opposite wall. The region of impact of an elbow extends along the outer curved portion of the elbow, although the intensity of the impact from suspended particles is not uniform along the length of the elbow. This portion of increased internal radius extends for approximately 180° measured in a plane transverse to the center line of the elbow.

An elbow constructed as just described is capable of receiving an abrasion-resistant lining of natural or synthetic rubber or other elastic material, which is of uniform internal diameter but is considerably thicker at that part thereof which is designed to overlie the region of impact, or impact region above described. This thickened portion of the lining has a greater life span than a thinner lining, not only because its greater thickness will insure a longer period of use before it is entirely destroyed, but because, being thicker, it has a greater cushioning effect on the impacting particles and so will not wear as rapidly as a thinner lining which, by reason of being secured in close proximity to the rigid metallic fitting wall, lacks the yielding qualities of the thicker lining.

A feature of the present invention is that the regions of the fitting where the lining is to be given greater thickness is substantially of the same wall thickness as the opposite or "upstream" wall of the fitting. Thereby the strength of the fitting is not impaired by the provision of a thicker lining, while at the same time the effective flow cross-sectional area is maintained equal to that of the pipe sections connected to the fittings. The center line of the passage through the fitting available to the flowing fluid is thus maintained in registry with the center line of the pipe section connected to both the entry and discharge ends of the fitting, and despite the externally irregular configuration of the fitting. The adjoining pipe sections can be lined or unlined, and in any case, the transition from the pipe attached to the entry end and that attached to the discharge end of the fitting is smooth and free from projecting shoulders.

The invention will be further described by reference to the accompanying drawing which illustrates the invention, by way of example, as applied to a pipe elbow. In said drawing, FIG. 1 is a fragmentary section through a 90° elbow constructed in accordance with the invention, and connected to an adjoining unlined straight pipe section by means of clamping rings;

FIG. 2 is a transverse section taken along the line 2—2 of FIG. 1.

FIG. 3 is an external view of the clamping ring half which is shown in section in FIG. 1.

FIGS. 4 and 5 are respectively end and top plan views of the clamping ring shown in FIG. 3.

FIG. 6 is similar to FIG. 1, but shows a different type of clamping ring applied to the lined elbow and unlined straight pipe section connected thereto; while FIG. 7 illustrates a lined elbow constructed in accordance with the invention and connected by clamping rings to a lined straight pipe section.

Referring to the drawing, whereas identical reference numerals are applied to corresponding parts throughout the several views, there is indicated at 10 a portion of a 90° elbow which is connected to a straight pipe section 11 which feeds into the elbow a liquid or gaseous stream containing suspended abrasive particles, such as slurries of various kinds. As is known, on passing through the elbow, suspended particles strike the wall portion of larger radius because of their tendency to flow in a straight line; also, as the direction of flow of the fluid stream is changed inside the elbow, the suspended particles tend to be thrown by centrifugal force against such outer wall.

In accordance with the present invention, the elbow is composed of parts of different radii, the outer part 12 being of greater internal and external radius than inner part 13. Each part extends for about 180° in a plane transverse to the flow center line of the elbow, and as indicated in FIG. 2, the two parts are externally joined by an inclined transition wall 14. As shown in the drawing, the wall parts of larger and smaller radii are of substantially the same thickness, so that the strength of the fitting is preserved.

Further, in accordance with the invention, the elbow is lined with an abrasion-resistant lining indicated at 15 which, corresponding to the interior configuration of the elbow, is formed of two integral parts 16 and 17, of which part 16 is of greater thickness than part 17. Part 16 fits into the elbow part 12 of greater internal radius, while the part 17 lines the inner surface of the section 13 of the elbow. The difference in thickness of the lining parts 16 and 17 is substantially the same as the difference in the radii of the inner surfaces of the parts 12 and 13 of the elbow, so that the inner surface of the lining is concentric with parts 12 and 13 of the elbow. The elbow can accordingly be lined up with the straight pipe section 11 in such manner that the center line of the flow cross-sectional area of the lined elbow is in registry with the center line of the pipe section 11, with the result that there is no discontinuity in the transition from the inner surface of the lined elbow and that of the straight pipe section.

The elbow 10 is provided with end flanges 18 for clamping to standard flanges 19 on pipe sections 11. However, because of the increased external radius of the part 12 of the elbow, there will usually not be sufficient clearance for the heads and/or nuts of bolts passing through holes in the outer portion 20 of the elbow flange and registering with bolt holes in the standard flange 19 of the adjoining pipe section end. Accordingly, there is employed at each elbow end a sectional clamping ring which bears against its flange and cooperates with a similar clamping ring bearing against the flange of the pipe section 11, the rings being provided with registering openings for receiving clamping bolts.

A suitable type of clamping ring segment is indicated at 21 and is provided with bolt holes 22. The segments of each ring are formed with an offset section 23 for receiving the interfitting end of the complementary ring segment of otherwise identical construction. A pair these half ring segments is applied against the flange 18 and another pair against the flange 19, with the bolt holes in registry, and the elbow 10 and pipe section 11 then clamped to each other by means of screws, as indicated at 24, or if desired, by bolts. Two segments per clamping ring will suffice for elbows of 2-inch to 8-inch diameters, while three-segment rings will generally be required for 10-inch and 12-inch elbows.

To insure fluid tightness, the lining 15 may be provided with a flange 24' which is disposed between the end flanges 18 and 19. The flanges 24' can be replaced by a separate gasket of the same or different material from the lining 15.

The means for clamping the elbow to an adjoining straight pipe section can also employ external grooves adjacent to the ends of the elbow and of the pipe sections to which it is to be connected, the clamping rings being received in such grooves and bolted to each other. This type of interconnection is known and has accordingly not been illustrated in the drawing. There is shown, however, in FIG. 6, a modification of a known type of coupling device, suitable especially for larger size fittings, which is sold under the name "Victaulic." For this type of multisectioned clamping device, the end flange 18 of the elbow is provided with an inclined surface 25 which is engaged by correspondingly shaped ends 26 of the segments 27, 28 of a clamping ring whose inner periphery is received in a standard groove 29 in the pipe section 11. The ring segments 27 and 28 have flanges 30, 31 which are provided with bolt holes and in which are received the stems of bolts 32, the ring segments being tightened with the aid of nuts 33. As the ring segments are tightened, the movement of the inner inclined surfaces of the end portions 26 of the ring segments on the inclined surface 25 of the elbow flange 18 drawn the ends of the elbow and pipe section 11 to each other into fluid-tight relation aided by the flange or gasket 24. To further insure a fluid-tight joint, a compressible gasket 34 can be provided.

Where the straight pipe section 11 is itself provided with an abrasion resistant linng 35, as shown in FIG. 7, the elbow 13 is so dimensioned that account is taken of such lining to the end that the surfaces of the linings 35 and 15 provide a smooth and unbroken transition between the fitting and the straight pipe sections. The lining 35 can also be provided with an end flange, shown at 36, which cooperates with the flange 24 to insure fluid tightness; and, like the latter, can be replaced by a gasket separate from the lining 35.

It will be understood that while I have shown a 90° elbow by way of example, may invention is equally applicable to 45° and 22½° elbows, to angular elbow of special design, and to other angular fittings, such as straight T's, as well as in reducing T's and cross T's (having four branches at 90° to each other) and to Y's of various configuration. In short, the present invention is applicable for the protection of the region of impact of any fitting which serves to alter the direction of flow of a fluent material of any kind, and particularly one having suspended abrasive particles. Thus, in the case of a Y with divergent flow, such as one having the feed line connected with an elbow, as indicated at A in FIG. 1, the region of impact will be at the opposite convex at B, and the thicker lining will then be at B; in other words, the cross-section in such case will be substantially the same as shown in FIG. 2, but rotated through approximately 180°.

Similarly, in the case of a Y fitting with a branch at an acute angle to the main conduit which feeds into it, the walls of the main and branch lines forming the acute angle will be given an enlarged radius, so as to receive a lining which is of greater thickness in such impact region. To facilitate insertion of the lining when the latter is relatively rigid, the Y can be formed of two parts which are bolted together.

The lining can be embodied in the metallic elbow or other fitting in any manner known to the art; for example, in the manner in which the known "Linatex" linings (manufactured by the Linatex Corporation of America, of Stafford Springs, Conn.), are incorporated in elbows. Thus, in the case of a vulcanizable lining, the uncured material can be applied to the interior of the elbow, whether the same has an integral straight extension or not, and then subjected to heat to effect vulcanization. Premolded or shaped linings can be secured within the arcuate elbow or other fittings by any suitable adhesive, such as an epoxide resin, or by the use of a primer and adhesive in known manner. Where the elbow consists entirely of a true arc of a circle (i.e., a section of a torus), such as is illustrated by way of example in the drawing, the elbow can be provided with a core having an external diameter substantially equal to the internal diameter of the lined elbow, and the space then filled with a sutiable elastomeric or other material, such as rubber or the components of a polyurethane composition or other polymer, to provide the desired lining. The core can be provided with a sutiable parting agent, such as silicone, and after the vulcanization or chemical reaction, the core can be withdrawn.

I prefer to make the linings of an elastomeric material like natural and synthetic rubbers, such as the "Linatex" linings referred to above; the invention is, however, not limited thereto. The lining can, for example, be made of other plastic materials, like urethane and high impact styrene polymers, and also ceramic materials and vitreous compositions.

The thicknesses of the lining parts 16 and 17 will, of course, vary with the diameters of the fittings. Thus in the case of elbows lined with a natural or synthetic rubber or rubbery composition, the minimum lining thickness for a 2-inch to 6-inch pipe will be about 3/16 inch, while the thickened portion will be 3/8-inch thick. An 8-inch, 10-inch and 12-inch pipe will have a minimum thickness of about 1/4 inch, while the minimum thickness of the part 16 will vary from 7/16 inch to 3/4 inch.

The lining may be made removable and replaceable, once it has become worn, by constructing the same with a fabric backing which creates a high degree of friction between itself and the interior wall of the fitting while not stiffening the end flanges, which may be integral with the body of the lining, to any material degree, so that they can be collapsed to enable the lining to be inserted in the elbow.

To give warning of the total wearing away of the lining with resultant weakening of the elbow wall on abrasion of the metal casting, a hole may be drilled through such wall about 60° from the end, in the case of a 90° elbow. Through such hole fluid material will leak, which will give notice that the elbow must be replaced or re-lined.

While the metal substrate of my lined fittings are usually made of cast iron, they can also be manufactured, especially in the larger sizes, say 6 inch diameter and larger, of steel and formed of two forged sections which are welded together, such structure, in the case of elbows, being less than half of the weight of cast iron elbows of equal internal diameter. The lining of the present invention is of particular value with such forged steel elbows, as they are much thinner than those of cast iron, and in may cases would, in use, and without a lining, have a shorter life than cast iron elbows.

I claim:

1. A lined pipe elbow, wherein the elbow itself is constructed of one piece and is provided with means at its ends for connection with adjacent pipe sections, said elbow in transverse cross-section being of larger internal radius in its outer portion of larger external radius than in its inner portion of smaller external radius, the portion of larger internal radius extending to at least one end of the elbow, the wall of the elbow being of substantially uniform thickness and continuous from its inlet to its outlet end, and a tubular abrasion-resistant lining fitting within the elbow and in transverse cross-section being thicker at its outer portion of larger external radius than at its inner portion of smaller external radius by substantially the difference between the aformentioned internal radii of the elbow itself.

2. A lined elbow according to claim 1, wherein the enlarged portion of greater radius both of the elbow and of the liner extends for approximately 180 degrees in transverse cross-section.

3. A lined elbow according to claim 1 wherein the elbow is of metal and is provided with shoulders adjacent to the ends thereof, and including split ring clamping members engaging said shoulders along inclined surfaces on said shoulders and rings, and adapted to releasably interlock with connecting pipe sections, said split ring clamping members having radical flanges provided with registering bolt holes for receiving tightening bolts.

4. An integral abrasion-resistant lining for pipe fittings which change the direction of flow of fluid material having abrasive solid particles in suspension, said lining being of continuously tubular form and capable of being inserted from one end of the pipe fittings, and composed of elastomeric material and being of a shape to change the direction of flow of material therethrough, said lining having a uniform bore, but being considerably thicker along the region which receives the impact of the flowing material than at its opposite wall portion, said lining for pipe fittings being in the form of an elbow wherein the thickened portion is along the larger radius and extends along the whole arc from one end of the elbow to the other, and in a plane transverse to the center line of the elbow, said plane portion subtending an angle of approximately 180°.

5. A pipe fitting constructed to change the direction of flow of a fluid entering the same, said fittings being of one piece and having means at its ends for connection with adjacent pipe sections, said fitting being of greater internal radius at the region of impact than at the opposite wall of the fitting, said region of greater radius extending to at least one end of the fitting, whereby the fitting can receive a lining which fits into such region and is insertable axially into the integral fitting from such end thereof, said fitting being in the form of a lined pipe elbow wherein the elbow is of larger radius in transverse cross-section in its outer portion than in its inner portion, the wall of the elbow being of substantially uniform thickness, the lining being of tubular form and of abrasion-resistant elastomeric material covering the entire inner surface of the elbow and overlapping an end of the elbow, said lining fitting within the elbow and in transverse cross-section being thicker at its outer portion of larger external radius than at its inner portion of smaller external radius by substantially the difference between the aforementioned internal radii of the elbow itself, the portion of greater radius of both the elbow and the liner extending for approximately 180° in transverse cross-section, the flow cross-section through the lining being substantially constant throughout the length of the fitting and being substantially the same as that of the pipe sections to be connected thereto.

References Cited

UNITED STATES PATENTS

| 494,671 | 4/1893 | Cooper | 285—55 |
|---|---|---|---|
| 898,882 | 9/1908 | Hawkins | 285—179X |
| 1,138,375 | 5/1915 | Griffin | 285—16 |
| 1,211,784 | 1/1917 | Stuart | 285—16 |
| 1,246,189 | 11/1917 | Vanderlip | 285—16 |
| 1,960,557 | 5/1934 | Snyder | 285—179 |
| 2,350,759 | 6/1944 | Hilmer et al. | 285—55X |
| 3,235,291 | 2/1966 | Jacoby | 138—140X |
| 3,284,106 | 11/1966 | McIntosh et al. | 285—55 |
| 2,608,501 | 8/1952 | Kimble | 285—55 |

FOREIGN PATENTS

| 1,358,692 | 3/1964 | France | 138—140 |
|---|---|---|---|
| 1,071,432 | 12/1959 | Germany | 285—16 |

DAVE W. AROLA, Primary Examiner

U.S. Cl. X.R.

285—55, 93, 179, 368; 138—140